(12) United States Patent
Grand et al.

(10) Patent No.: US 6,222,963 B1
(45) Date of Patent: Apr. 24, 2001

(54) PHASED ARRAY DEVICE OR PHASAR AND PROCESS FOR MANUFACTURING THIS DEVICE

(75) Inventors: Gilles Grand, Grenoble (FR); Vincent Delisle, Ottawa (CA); Patrick Pouteau, Voreppe (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/179,133

(22) Filed: Oct. 26, 1998

(30) Foreign Application Priority Data

Oct. 27, 1997 (FR) .................................................. 97 13440

(51) Int. Cl.[7] ...................................................... G02B 6/26
(52) U.S. Cl. .................................. 385/39; 385/37; 385/50
(58) Field of Search ................................. 385/24, 37, 39, 385/46, 48, 50, 52

(56) References Cited

U.S. PATENT DOCUMENTS

| | | | |
|---|---|---|---|
| 5,243,672 | * 9/1993 | Dragone | 385/46 |
| 5,732,171 | 3/1998 | Michel et al. | |
| 5,732,173 | * 3/1998 | Bylander et al. | 385/49 |
| 5,960,131 | * 9/1999 | Fouquet et al. | 385/17 |

FOREIGN PATENT DOCUMENTS

| | | |
|---|---|---|
| 0 528 652 A1 | 2/1993 | (EP) . |
| 9-269514 | 10/1997 | (EP) . |
| 8-234029 | 9/1996 | (JP) . |
| WO 96/00915 | 1/1996 | (WO) . |
| WO 97/11396 | 3/1997 | (WO) . |

OTHER PUBLICATIONS

IEEE Photonics Technology Letters, vol. 3, No. 9, Sep. 1991 "An n X n Optical Multiplexer Using a Planar Arrange of Two Star Couplers" C. Dragone, pp 812–815.
EFOC/LAN 91, 9th Annual Eurpoean Fibre Optic Communications . . . , Conference Held Jun. 19–21, 1991, 16–Channel Optical Wavelength Multiplexer/Demultiplexer Integrated on Silicon Substrate, G. Grand et al. pp. 264–267.
Electronics Letters, Feb. 13, 1992, vol. 28, No. 4, "10 GHz Spacing Optical Frequency Division Multiplexer Based on Arrayed–Waveguide Grating" H. Takahasi et al, pp. 380–382.
Electronics Letters, Aug. 15, 1996, vol. 32,; No. 17, Statically–Phase–Compensaated 10 GHz–Spaced Arrayed–Waveguide Grating H. Yamada et al, pp. 1580–1582.
OFC '95 Technical Digest, Tuesday Afternoon, "Novell X N Guided–Wave Multi–Demultiplexer for FDM", H. Uetsuka et al, pp. 76–77.

(List continued on next page.)

Primary Examiner—Frank G. Font
Assistant Examiner—Layla G. Lauchman
(74) Attorney, Agent, or Firm—Anderson, Kill & Olick P.C.

(57) ABSTRACT

This device comprises a planar input area (4), a planar output area (6), a microguides array (2) laid out between these areas, means (8) of inputting a light beam associated with the input area and means (10) of outputting a light beam associated with the output area. According to the invention, at least two pieces (12, 16, 22) are formed, one comprising one part of at least one of the areas and the corresponding associated means, the other comprising the other part of this area and the other components of the device, and the pieces are added on so as to form the complete device and to adjust the wave length of this device. Application to optical telecommunications and optical spectrometry.

20 Claims, 3 Drawing Sheets

OTHER PUBLICATIONS

EWC4–"Recent Improvements in Arrayed Waveguide Grating Dense Wavelength Division Multi/Demultiplexers" H. Uetsuka et al, pp. 76–79.

Genie Electrique "A Monolithic Multiplexed 16–Wavelength WDM Transmitter with Accurate Channel Spacing" C.R. Doerr et al, pp. 12–2/12–6.

Electronics Letters, Apr. 27, 1995, vol. 31, No. 9, Y.Inoue et al, pp. 726–727.

WDM Devices II "Optical Phased Array in SiO2/Si With Adaptble Center Wavelength" P.C. Clemens et al.

1996 IEEE, 1996 Electronic Components and Technology Conference "Multifiber Optical Components for Subscriber Networks" H. Yokosuka et al, pp. 487–493.

IEE Journal of Selected Topics in Quantum Electronics, vol. 2, No. 2, Jun. 1996, "Phasar–Based WDM–Devices: Principles, Design and Applications" M.K. Smit et al, pp. 236247.

IEE Photonics Technology Letters, vol. 8, No. 3, Mar. 1996, "Multiple 32–Fiber Array Connection to Silica Wavegu;ides on Si", M. Ishii et al, pp. 387–389.

* cited by examiner

PHASED ARRAY DEVICE OR PHASAR AND PROCESS FOR MANUFACTURING THIS DEVICE

DESCRIPTION

1. Technical Domain

This invention relates to a phased array device, or PHASAR, and a process for manufacturing this device.

This type of device is also called AWG (for Arrayed-Waveguide Grating) and is applicable particularly to:

the domain of telecommunications by optical fibers that use wave length multiplexing and demultiplexing, and the domain of optic spectrometry.

The device according to the invention will be called a PHASAR throughout the rest of this description.

2. State of Prior Art

A PHASAR is an integrated optical device based on a particular type of dispersive grating.

It comprises an array of optical microguides which create a periodic phase shift.

Further information on this subject is given in documents (1), (2) and (12) which, like the other documents referenced later, are mentioned at the end of the description.

This type of dispersive grating does not use a facets manufacturing technique as is the case in diffraction gratings used in conventional optics and integrated optical devices forming etched diffraction gratings.

Refer to document (3) for further information on this subject.

FIG. 1 is a diagrammatic view of a known PHASAR with a conventional double S shape.

The PHASAR in FIG. 1 comprises a central array of light guides or microguides 2 and two planar areas 4 and 6.

One side of the planar area 4 is optically coupled to one side of the microguides array 2.

Similarly, one side of the planar area 6 is optically coupled to the other side of the microguides array 2.

In the example shown, the other side of area 4 is optically coupled to means of inputting a light wave composed of set of light guides or microguides 8.

Similarly, the other side of area 6 is optically coupled to light wave output means composed of a set of light guides or microguides 10.

Thus, the microguides 8 form the PHASAR input microguides in FIG. 1 and the microguides 10 form the output microguides from this PHASAR.

There may be a single input microguide and several output microguides (for example for wave length demultiplexing) or several input microguides and a single output microguide (for example for wave length multiplexing).

There could also be optical components other than the PHASAR input and/or output microguides.

A PHASAR may also be connected to input and/or output optical fibers.

It can also be monolithically integrated into input light sources and possibly connected to output optical fibers.

A PHASAR may also be monolithically integrated into output photodetectors and possibly connected to input optical fibers.

FIG. 1 illustrates the case of demultiplexing for a PHASAR with E inputs and N outputs.

A polychromatic light wave with wave lengths denoted $\lambda i1, \lambda i2, \ldots, \lambda iN$, is injected into one $i$ of the input channels 8, where i varies from 1 to E, the channels being microguides in this example.

The PHASAR is designed to provide light with wave lengths $\lambda i1, \lambda i2, \ldots, \lambda iN$ respectively on the N output microguides 10.

The planar areas 4 and 6 are regions in which light can propagate freely.

The planar area 4 enables the width of the polychromatic light wave to expand, in order to light up the entire width of the central microguides array 2.

A combined interference and focusing effect occurs along the planar area 6, located at the output from the microguides array 2, which makes it possible to separate wave lengths $\lambda i1, \lambda i2, \ldots, \lambda iN$ from each other, and to obtain light with wave lengths $\lambda i1, \lambda i2, \ldots, \lambda iN$, respectively at the output from the N microguides 10.

Therefore the central array, associated with area 6, forms the PHASAR dispersing element.

In general, the particular feature of a PHASAR lies in the process of creating the periodic phase shift necessary to separate wave lengths.

This phase shift is obtained by means of the microguides array 2, the number of microguides being denoted M.

The optical paths corresponding to these M microguides are different from each other.

The difference D between two consecutive optical paths, called the optical step difference, is equal to a constant.

This optical step difference D satisfies the following equation:

$$D = \int r_k n_k ds_k - \int r_{k+1} n_{k+1} ds_{k+1} = 2\pi p \lambda_m \qquad (1)$$

in which p is the order of the diffraction grating formed by the PHASAR $\lambda_m$ represents the average wave length of the PHASAR, also called the central wave length of the PHASAR k is the number of a microguide in the PHASAR central array, the index k varying from 1 to M $n_k$ is the effective index at a point on the curved abscissa $S_k$ along microguide number k $S_k$ is the curved abscissa along microguide number k.

The first curved integral is calculated along the path $\Gamma_k$ varying from input point $A_k$ to output point $B_k$ of microguide number k.

Similarly, the second curved integral is calculated along the path $\Gamma_{k+1}$ from input point $A_{k+1}$ to output point $B_{k+1}$ of microguide number k+1.

For example, FIG. 1 shows path $\Gamma_1$ varying from point $A_1$ to point $B_1$ on microguide number 1, and path $\Gamma_M$ from point $A_M$ to point $B_M$ on microguide number M.

Note that if necessary, the PHASAR in FIG. 1 and also in other figures can also be used in the opposite direction, based on the principle of inverse return of light.

In this case, the input becomes an output and the output becomes an input.

Thus in this description, the words "input" and "output" are used for simplification, but it would be more accurate to talk about input/output.

There are many advantages of a PHASAR compared with devices using etched diffraction gratings made using integrated optics techniques (see document (3)).

Some of the main advantages are:

production of a PHASAR with a single masking level, the possibility of achieving a low level of losses (2 to 3 dB) instead of 5 to 7 dB in case of devices using etched diffraction gratings, for a PHASAR, the possibility of working with several inputs and several outputs, with a PHASAR, the possibility of increasing the spectral density (in other words reducing the difference between dispersed wave lengths when demultiplexing) up to values of the order of 0.008 nm (frequency 10 GHz)—see document (4)—due the use of operation with very high orders p of the diffraction grating (p typically being equal to 100), without introducing any additional losses.

Known PHASARs have disadvantages.

Firstly, for applications with a high spectral density, it is absolutely essential to adjust the wave length of a PHASAR as a function of light sources.

Since light sources themselves have a perfectly defined wave length, the objective is to very precisely fix the central wave length or the average wave length $V\lambda_m$ m of the PHASAR.

The problem is the same in the spectrometry domain.

Dispersed wave lengths have to be measured in absolute terms.

The error on the wave length is related to the error on the optical step difference D.

There are three additional main sources of uncertainty:

the difference between the required index and the obtained index an average index gradient on the width of the central microguides array a systematic error on the length.

Consider an example for which an experimental set up was made (see document (12)).

In this example, the difference between the multiplexed/demultiplexed wave lengths $\Delta\lambda$ is equal to 1.6 nm, the pitch (p) of the PHASAR diffraction grating considered is equal to 60 and the required central wave length is equal to 1.55 $\mu$m.

An uncertainty calculation carried out using approximate data on the three causes of errors mentioned above and starting from equation (1) gives a relative uncertainty on the optical step difference equal to:

$\Delta D/D$ very close to $1.6\times10^{-3}$.

This thus gives an uncertainty $\Delta\lambda_m$ on the central wave length of the PHASAR $\lambda_m$ which is very close to 2.4 nm.

Consequently, the uncertainty on $\lambda_m$ may be greater than the spectral difference $\Delta\lambda$ between the multiplexed/demultiplexed wave lengths.

In practice, this makes it impossible to work with light sources with fixed wave lengths in the multiplexing/demultiplexing domain (for optical telecommunications) and to measure absolute wave lengths in the spectrometry domain.

This error on $\lambda_m$ has been confirmed by experiments done by the authors of this invention.

Several means are already known for making an adjustment in the wave length (in other words to adjust and fix $\lambda_m$).

It is always necessary to compensate for the error on $\lambda_m$ using different techniques.

A first known technique is adjustment by a thermo-optical effect.

It is always possible to match the average wave length by thermo-optical effect (variation of the optical path as a function of the temperature) by controlling the PHASAR operating temperature, since silica has a non-negligible coefficient of thermal expansion. Further information on this subject is given in document (6).

The disadvantage of this technique lies in the insufficient compensation latitude (about one tenth of the spectral variation $\Delta\lambda$).

A second known technique is adjustment by modification of inputs/outputs.

It was proposed to add channels in an appropriate manner at the PHASAR input and output in order to adjust the average wave length by shifting it in steps of $\Delta\lambda/10$ in a manner similar to an optical vernier system.

Further information on this subject is given in document (7).

The major disadvantage of this second known technique lies the difficulty of the process used, since the objective is to determine which are the right input/output channels before fixing them.

A third known technique consists of using a laser ablation adjustment of a phase shift layer added on the circuit.

If there is a genuinely low spectral variation (10 GHz), another "static" solution consists of placing a layer of amorphous silicon itself adjusted by laser ablation on each central microguide.

Further information on this subject is given in document (5).

This third known technique is very attractive since it can also give better intrinsic performances, but it is extremely expensive since it complicates the technique and requires a sophisticated measurement of the phase at the output from each microguide.

Known PHASARs have a second disadvantage; they necessarily occupy a large surface area.

Typically, the PHASAR mentioned above (1.6 nm spectral variation, 16×16 channels) can be made on a 1.7 cm×4.2 cm rectangular surface, which means that 7 can be made on a board with a diameter equal to 100 cm.

The reasons for these dimensions are related to:

the fundamental operation of the PHASAR that imposes a large difference in length between the microguides in the central array (typically several millimeters between the extreme microguides)

the "single-piece" design of the PHASAR.

For example, if it is required to form a PHASAR on a single element with the input and output aligned along the same direction, and in which the microguides of the central array have large length differences, a conventional double S shape as shown in FIG. 1 is necessarily obtained which requires a large surface area.

A number of folding techniques are known for correcting this disadvantage.

These are described in documents (8) and (9).

The disadvantage of these techniques is due to:

the need to provide an additional mirror by cutting and cleavage, which complicates the manufacturing technique, and the fixed nature of the PHASARs obtained which, combined with the lack of precision of the cut, necessarily introduces additional problems for the wave length adjustment.

DESCRIPTION OF THE INVENTION

The purpose of this invention is to overcome the disadvantages mentioned above.

Its first purpose is a phase array device or a PHASAR comprising the following components:

a planar input area, a planar output area, a microguides array laid out between these areas, means of inputting a light beam associated with the planar input area, and means of outputting a light beam associated with the planar output area, this device being characterized in that it comprises at least two pieces called the first and second pieces, the first piece comprising one part of at least one of the planar areas and the corresponding associated means, the second piece comprising the other part of this planar area and the other components of the device, and in that the first and second pieces are added on so as to form the complete device and to adjust the wave length of this device.

In a first particular embodiment of the device according to the invention, the first piece comprises part of only one of the two planar areas and the second piece comprises the other part of this planar area and the entire other planar area.

According to a second particular embodiment, the first piece comprises one part of each of the first and second planar areas and the second piece comprises the other parts of the first and second planar areas.

According to a particular embodiment, these other parts are located on the same side of the second piece.

According to a third particular embodiment, the device comprises three pieces called the first, second and third pieces, the first piece comprising part of one of the planar areas and the corresponding associated means, the second piece comprising part of the other planar area and the corresponding associated means, and the third piece comprising the other parts of the planar areas and the microguides array, and in that the first, second and third pieces are added on to form the complete device and to adjust the wave length of this device.

In this case, the other parts of the planar areas may be located on the same side of the third piece.

Preferably, the light wave input means and light wave output means are approximately in a straight line starting from the planar areas of each.

According to one preferred embodiment of the device according to the invention, this device also comprises a support on which the pieces are added.

Pieces may be added on to this support so that they cannot be removed.

As a variant, at least one piece comprising a part of the planar area and the corresponding associated means may be added to the support so that they can be removed.

This invention also relates to a process for manufacturing the device according to the invention, this process being characterized in that pieces are shaped, these pieces are added on to form the complete device, and the wave length of this device is adjusted.

According to one particular embodiment of the process according to the invention, a relative displacement of one piece with respect to the other piece is made to adjust the central wave length of the device.

Light wave input means and light wave output means may be optically connected to optical fibers and/or light emitters-receivers before the wave length of the device is adjusted.

Each piece may be formed on a substrate that may be cleaved and then separated from this substrate by cleavage.

As a variant, each piece may be formed on a substrate and then separated from this substrate by sawing.

It may be necessary to polish one of several edges of this piece, depending on the surface condition obtained for each edge of this piece.

BRIEF DESCRIPTION OF THE FIGURES

This invention will be better understood after reading the description of example embodiments given below, which is given purely for guidance and is in no way restrictive, with reference to the attached drawings in which.

DETAILED DESCRIPTION OF PARTICULAR EMBODIMENTS

Figure 2:
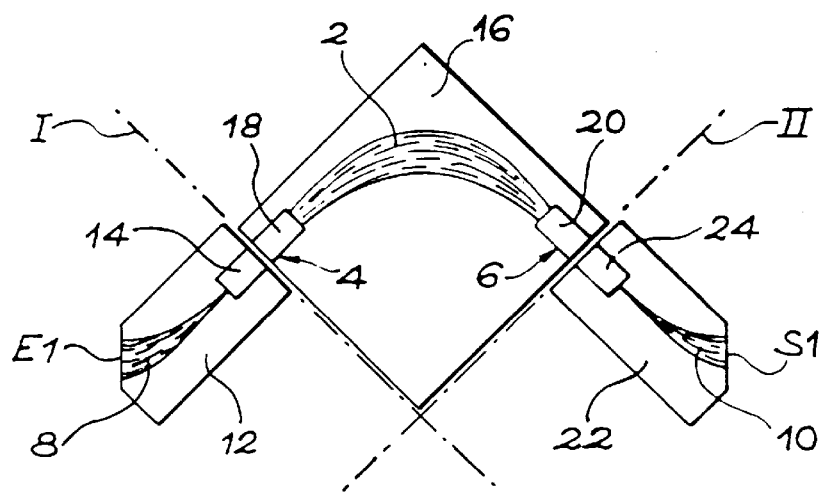
FIG. 2 is a diagrammatic top view of a particular embodiment of a PHASAR according to the invention.

FIG. 2 diagrammatically illustrates a PHASAR according to the invention.

Figure 1:
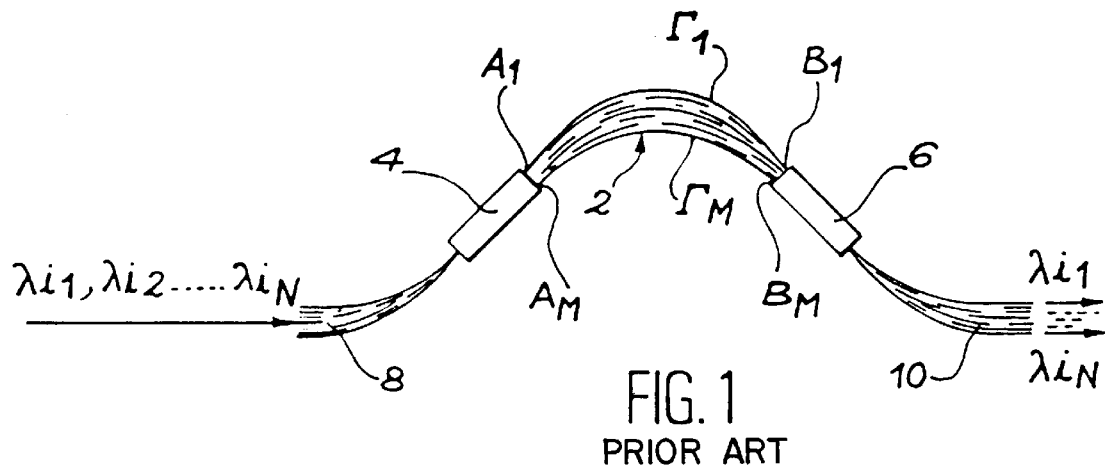
FIG. 1, already described, is a diagrammatic top view of a known PHASAR with the shape of a double S.

This PHASAR has the same components as the PHASAR in FIG. 1 and the same references are used for the same components in FIG. 2.

However, the PHASAR in FIG. 1 is made in a single piece; all its components are formed on the same substrate (not shown).

On the other hand, the PHASAR in FIG. 2 is made in three pieces.

The first piece 12 comprises:
one part 14 of the planar input area 4 and
input microguides 8 that end in this part 14.
The second piece 16 comprises:
the central microguides array 2,
on one side of this array, the part 18 that forms the complement of part 14 of the planar input area and
on the other side of this central microguides array, a part 20 of the planar output area that extends the central microguides array 2.
The third piece 22 comprises:
the other part 24 of the planar output area 6, that forms the complement of part 20, and
the exit microguides 10 that extend this planar output area 6.

In the example shown, the separating line I between parts 14 and 18 of the planar input area 4 passes approximately through the middle of this planar area.

Similarly, the separating line II between parts 20 and 24 of the planar output area 6 (in this example) passes approximately through the middle of this planar area.

However in some cases, line I and / or line II may beneficially be very close to the associated microguides 8 or 10. This is also true for other variants of the invention.

Pieces 12, 16 and 22 are made independently of each other.

Pieces 12, 16 and 22 can be made on the same appropriate substrate, usually several at the same time, and these pieces may then be cut and assembled to form the PHASAR in FIG. 2.

Piece 12 can also be made on an appropriate substrate (usually several at the same time), and piece 16 can be made on a different appropriate substrate (usually several at the same time), and the same can be done for piece 22.

In this case, the pieces are once again cut to form the PHASAR in FIG. 2 (several at the same time).

The PHASAR in FIG. 2 can even be made in a single piece on a substrate, the three pieces can be cut out from this substrate and assembled to form the PHASAR in FIG. 2. In the example shown, the top view of piece 16 is in the shape of a square in which two adjacent sides are parallel to lines I and II respectively.

Piece 12 is approximately in the shape of a rectangle from which one triangular corner has been cut, revealing an input plane E1 of the PHASAR.

The input microguides 8 arrive perpendicular to this input plane E1, as can be seen in FIG. 2.

Piece 22 is also in the shape of a rectangle without a triangular corner revealing an output plane S1 of the PHASAR in FIG. 2.

The output microguides 10 also arrive perpendicularly to this output plane S1.

As will be seen better later, once the pieces have been obtained they are assembled, adjusted with respect to each other and then fixed together rigidly for example by gluing.

This type of process has three advantages.

The first advantage is that if the pieces are adjusted with respect to each other dynamically, in other words checking the PHASAR output wave length, the central wave length of the PHASAR can be adjusted optomechanically.

This adjustment method is already divulged in document (10), but this document (10) refers to moving a single optical fiber in front of the PHASAR input.

With the process according to the invention, all input microguides and all output microguides can be moved simultaneously.

The second advantage is that if pieces of the PHASAR are made independently of each other (independent production of a substrate containing the central microguides array and two parts of the planar areas, a substrate containing part of a planar area and the corresponding microguides and a substrate comprising part of the other planar area and the corresponding microguides), there is an improvement equal to a factor of three on the surface area of the PHASAR as will be described in more detail later.

Furthermore, pieces 12 and 22 may be "linearized" if the double S shape of the PHASAR is abandoned.

Figure 3:
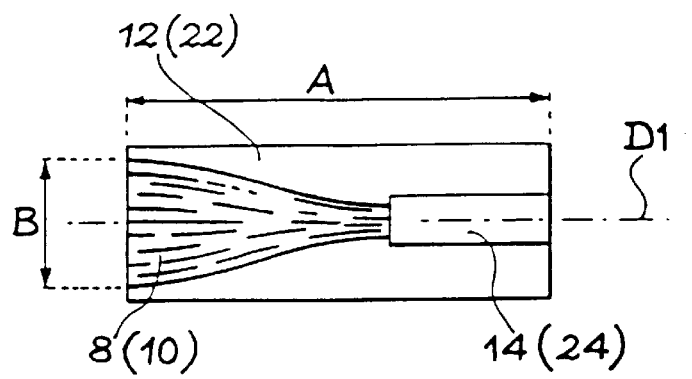
FIG. 3 is a diagrammatic top view of an input or output part of a PHASAR according to the invention, this part being approximately linear.

This is diagrammatically illustrated in the top view in FIG. 3.

FIG. 3 shows a part 14 or 24 of the planar area prolonged by the corresponding microguides 8 or 10 which are no longer curved in the case shown in FIG. 3 as they were in the case shown in FIG. 2, but extend approximately along a straight line in direction D1 in the same way as part 14 or 24.

The central microguides array of piece 16 remains approximately in the shape of a quarter of a circle.

The third advantage is that in the case of a connection of optical elements (optical fibers, emitters, receivers, etc.) at the PHASAR input (in other words the input microguides to piece 12) and at the output from this PHASAR (in other words at the output microguides from piece 22), the efficiency of the complete manufacturing that includes the connection of these optical fibers is improved mainly by the fact that in this case the connections are made independently from each other at the PHASAR input and output.

This results in two advantages.

The first is that an "active" connection (in other words a connection requiring control of light flux during the operation) is simplified since the device does not include any dispersive elements.

The second advantage is that a set (input or output) of connections that are not working (in other words bad recovery of the operational part of the structure) only eliminates part (input or output microguides) of the device rather than eliminating the entire area of the device.

Two techniques can be used for the breakdown into pieces.

If the substrate(s) on which the pieces are made can be cleaved, which is the case of crystalline substrates such as silicon substrates, then the pieces may be obtained by cleavage, in other words by breakage along crystallographic substrate planes.

Pieces can also be sawn and then their edges or sides resulting from sawing can be polished if the optical quality of the sawn faces is not sufficient.

Document (11) contains information about the current performances of sawing.

The cutting process is not critical from the precision point of view, since each planar area is very long (several millimeters) compared with the inaccuracy due to sawing (a few micrometers) or even with respect to cleavage (a few tens of micrometers).

Figure 4:
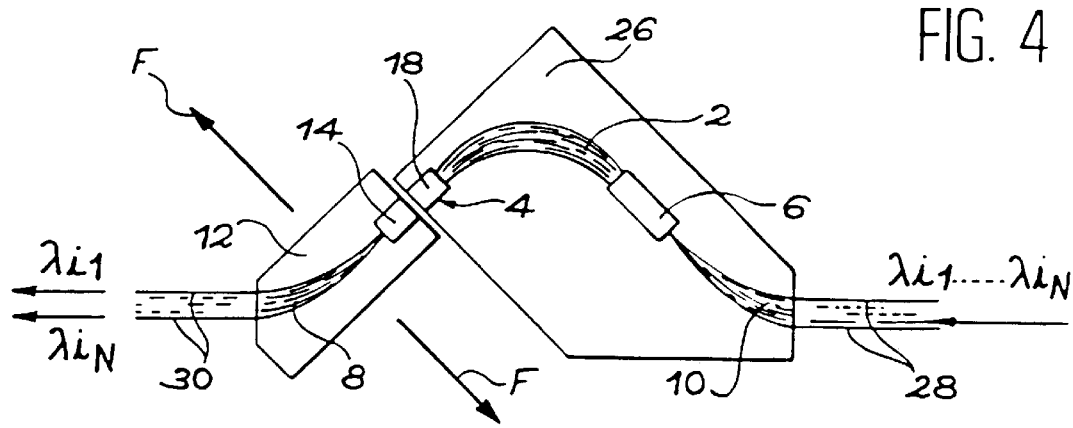
FIG. 4 is a diagrammatic top view of another PHASAR according to the invention.

Having said this, sawing is still preferable to cleavage since it does not induce any constraints on the shape of the PHASAR, whereas cleavage necessitates right angles almost everywhere as can be seen in FIG. 2 and also in FIG. 4.

This FIG. 4 diagrammatically illustrates an example process for opto-mechanical adjustment of the average wave length or the central wave length of the PHASAR for wave length demultiplexing.

Note that the PHASAR according to the invention shown in FIG. 4 only includes two pieces 12 and 26, but this will be discussed later.

It can be seen that the microguides 10 used here as input microguides are connected to optical fibers 28 and that the microguides 8 used here as output microguides are connected to optical fibers 30.

As a variant, the microguides 10 could have been connected to light emitters and/or the microguides 8 could have been connected to light receivers, without the use of optical fibers.

These emitters and/or receivers may be hybridized, added on or integrated into the PHASAR depending on the nature of the material used to make this PHASAR.

More generally, any active opto-electronic component (for example emitters, receivers or light amplifiers) or passive opto-electronic component (for example other connection components in integrated optics) may be positioned (by hybridization, transfer or integration) at the input and/or the output.

According to one particular operation of the PHASAR (demultiplexing), light composed of several wave lengths $\lambda i1, \lambda i2, \ldots \lambda iN$ is injected into one $i$ of the E input optical fibers 28 to recover a single wave length at the output in each of the N output fibers.

Therefore, the objective is to obtain a single wave length per optical fiber 30 (output optical fiber).

As can be seen in FIG. 4, the wave length adjustment is made by moving the PHASAR piece 12 which includes part of the planar area 14 and the corresponding microguides 8 and the optical output fibers 30 connected to it, with respect to the rest of the PHASAR and particularly with respect to the other part of the planar area 18.

In the example shown in FIG. 4 ($SiO_2$ substrate), the input/output microguides being about 20 $\mu$m apart (regardless of the spectral spacing Δλ, a displacement of piece 12 by 1 μm corresponds to a displacement in λ of Δλ/20, therefore the order of magnitude of the sensitivity is compatible with the precision of micromanipulators.

For example, in the case of an InP substrate, this distance of 20 μm between microguides is typically reduced to a value of the order of 5 μm.

Positioning within 0.5 μm (possible with micromanipulators available on the market) still gives a precision of Δλ/10, which is sufficient for most applications.

For the displacement of piece 12, a mechanical device shown by arrows F is used to displace the part of the planar area 14 of piece 12 transversally with respect to the complementary part 18.

Thus, a transverse adjustment is made that modifies the average wave length $\lambda_m$.

This adjustment is made until one wave length is achieved for each output optical fiber.

When the adjustment is terminated, piece 12 is fixed in position with respect to the rest of the PHASAR shown in FIG. 4.

Figure 5:
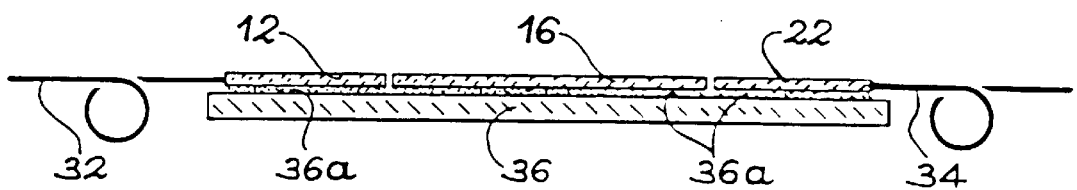
FIG. 5 is a diagrammatic cross-sectional view of a PHASAR according to the invention, in which the various pieces are glued onto a support.

FIG. 5 diagrammatically illustrates gluing of the pieces of a PHASAR according to the invention on a support after these pieces have been adjusted.

In the case shown in FIG. 5, the PHASAR is of the type shown in FIG. 2 and thus comprises three pieces 12, 16 and 22 that are seen in cross-section.

A set of input optical fibers 32 connected to input microguides 8 and a set of output optical fibers 34 each connected to output microguides 10 of the PHASAR, can also be seen.

For example, the first step is to glue piece 16 containing the central microguides array 2 on a plane support 36 using an appropriate glue 36a, for example a glue that can be polymerized by ultraviolet radiation.

The other two pieces 12 and 22 are held in place with respect to piece 16 by appropriate mechanical means (not shown) and the three pieces are optomechanically adjusted as described above.

This is done:
  according to a first example of the process, light containing only the standard wave length kim (where i is between 1 and E and m is between 1 and N) is sent in the input fiber i (i between 1 and E), when this light is required to be output on the optical fiber m on entering fiber i, and transverse displacements of pieces 12 and 22 are made until maximum light is obtained in this fiber m,
  according to a second example of the process, polychromatic light containing this same standard wave length is sent and the output fiber m is checked using a spectrophotometer,
  according to a third example of the process, in the case of a spectrometry in which the optical output fibers are replaced by add-on, hybridized or integrated detectors, a wave length kim is injected on input i as in the first example of the process, and the elements are moved until detector number m receives the maximum amount of light.

Note that pieces 12 and 22 are previously coated with a glue 36a that can be polymerized by ultraviolet radiation and positioned with respect to the two sides of piece 16, for example using precision micromanipulators.

When the wave length adjustment has been made, pieces 12 and 22 are fixed by ultraviolet insolation on the plane support 36.

We will now explain the gain in surface area that was mentioned above.

Consider the known PHASAR mentioned above, with the following characteristics:
  Δλ=1.6 nm
  16 inputs and 16 outputs
  total surface area: 4.5 cm×1.7 cm A graphic study shows that not more than seven PHASARs can be integrated on a board (substrate) with a diameter equal to 100 mm.

Each central microguides array measures 1.25 cm×1.25 cm.

45 can be integrated on the same surface area, or 22 on a half-board.

"Linearized" inputs/outputs like those shown in FIG. 3, have dimensions A×B where A=0.5 cm and B=2.2 cm.

70 of these inputs/outputs can be integrated on the same surface area, or 35 on a half-board.

One central microguides array and two inputs_outputs are necessary to obtain a complete PHASAR.

Therefore, by adding two half-boards, about 20 complete PHASARs can be obtained on a 100 mm board, so that this invention introduces a gain in surface area by a factor of 3.

Note that this invention can be used independently of the light guide material used.

This material may for example be based on silica, glass or InP or GaAs type semi-conductor alloys.

A PHASAR according to the invention can be made from two instead of three pieces if there is no need to adjust the wave length.

This is diagrammatically shown in FIG. 4, which shows one PHASAR composed of two pieces 12 and 16.

Piece 12 is identical to piece 12 in FIG. 2.

The other piece 26 contains the central microguides array 2 equipped firstly with the part of the planar input area 18 complementary to part 14 which is located on piece 12 and secondly, the complete output planar area 6 fitted with the output microguides 10.

The use of a PHASAR in two pieces reduces the final gluing time, since there is only opto-mechanical adjustment instead of two.

Figure 6:
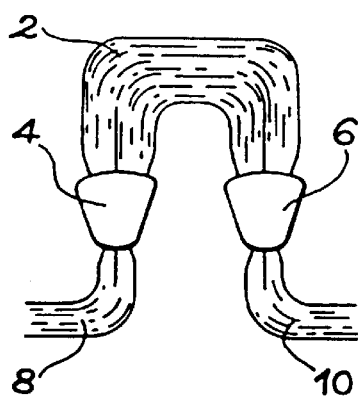
FIG. 6 is a diagrammatic top view of another known PHASAR with the shape of a U.

FIG. 6 shows a diagrammatic top view of a known PHASAR structure as described in document (12).

This PHASAR is approximately U-shaped (seen upside-down in FIG. 6).

Figure 7:
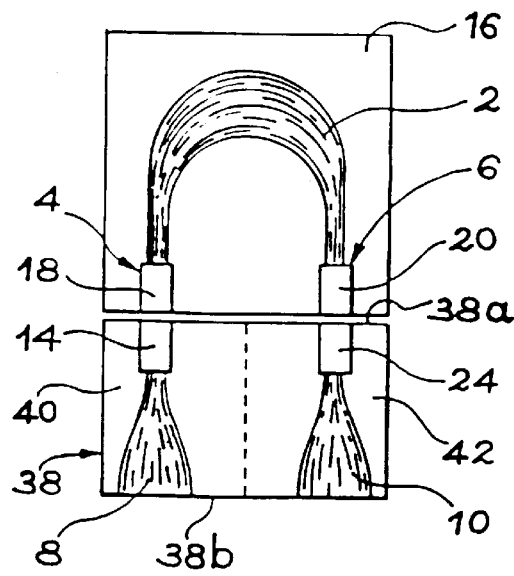
FIG. 7 is a diagrammatic top view of another PHASAR according to the invention, FIG. 8 diagrammatically illustrates the advantage of making a separation inside a planar area rather than in front of it, and FIGS. 9 and 10 diagrammatically illustrate particular embodiments of this separation.

With this type of structure, a PHASAR according to the invention can be made of two pieces (see FIG. 7).

One piece 16 of this PHASAR comprises the central microguides array 2, at one side of which there is part 18 of the planar input area 4 and at the other side of which there is part 20 of the planar output area 6.

These two parts 18 and 20 terminate on the same side or edge of piece 16.

The other piece 38 of the PHASAR comprises two other parts 14 and 24 of planar areas 4 and 6 respectively.

These parts 14 and 24 are fitted with input microguides 8 and output microguides 10 respectively.

These other two parts 14 and 24 also terminate at to the same side or edge 38a of this other piece 38.

In the example in FIG. 7, the input and output microguides have been "linearized", as shown in FIG. 3 already described.

These input and output microguides also terminate on the same edge 38a of piece 38.

As can be seen in FIG. 7, the edges 38a and 38b are facing each other.

Piece 38 can be separated into two parts 40 and 42 if it is required, in order to save area.

Part 40 then comprises elements reference 8 and 14, whereas part 42 comprises elements reference 10 and 24.

The PHASAR in FIG. 7, in which the input and output are located on the same side of this PHASAR, may be beneficial particularly if the connection operation with the optical fibers is passive.

Instead of fixing the average wave length $\lambda_m$ of the PHASAR by gluing, it may be useful in some applications to keep the possibility of opto-mechanical adjustment of this wave length $\lambda_m$.

In this case, an appropriate assembly should be used.

For example, a mechanical assembly could be used with adjustment screws. In this assembly piece 12 and piece 22 (when the PHASAR is in three pieces 12, 16 and 22) are removable.

For example, this can be done using wax, with a melting temperature greater than the maximum usage temperature of the PHASAR.

Figure 8:
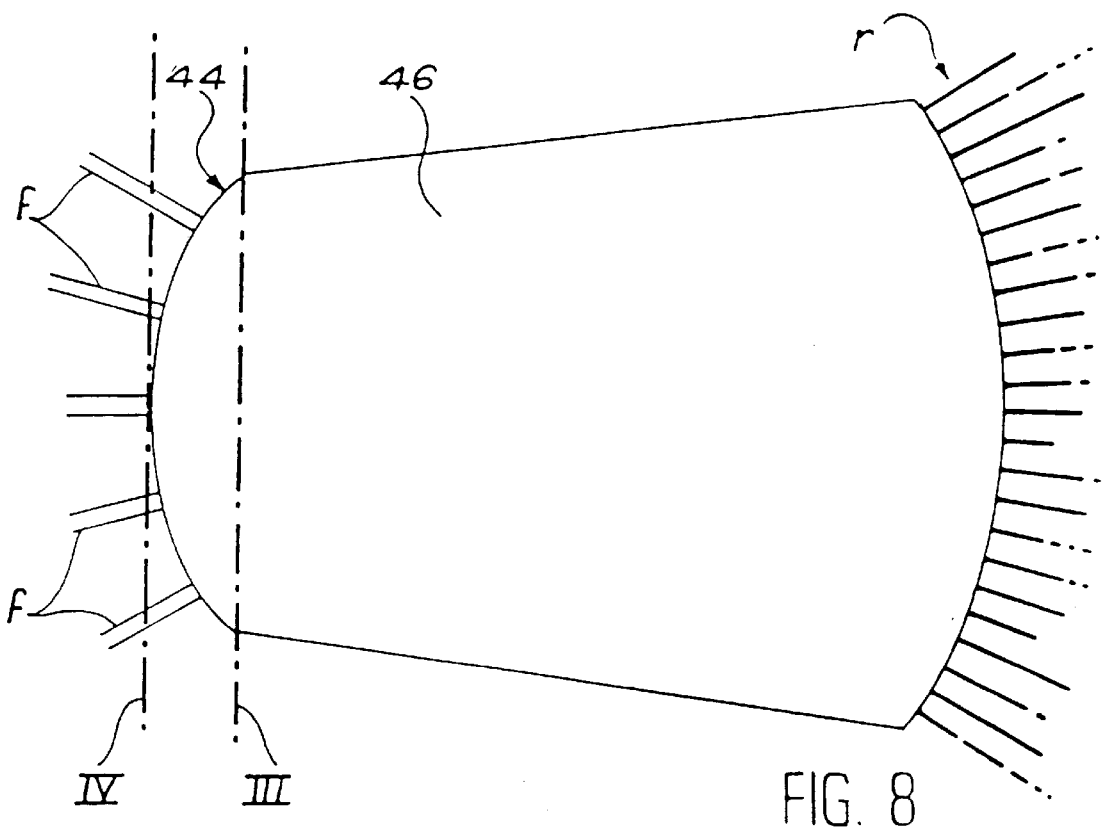

We will now justify the advantage of a separation into two pieces inside the corresponding planar area, as is done within this invention, compared with the technique described in document (14) where the separation is done "in front of" the planar area, where the planar area begins. In general, separation inside the planar area requires no positioning tolerance along the direction of the optical axis of this area. This is not the case in document (14), in which on the contrary the separation must be made precisely on the input diopter of this area. More particularly, for a N to N type PHASAR (N>1), it can be seen in FIG. 8 (f=access guides to the planar area and r=microguides array) that the input diopter 44 into the planar area 46 is an arc of a circle (with a large radius) and not a straight line (which can already be seen in FIG. 6). This means that a linear separation at this location will necessarily be located slightly inside the planar area (line III) and not at line IV. Consequently, document (14) is not strictly correct, or in any case is not applicable to a large number N of input channels, whereas this invention is applicable regardless of the value of N.

In FIGS. 2, 4 and 7, each piece separation plane makes an angle of 90° with the planar area at which the separation takes place and with the optical axis of this planar area.

However, this is not compulsory: the angle in question may be different from 90° in order to avoid parasitic light reflection phenomena. More precisely in the invention, two parts of a planar area which are joined to each other, may be joined according to a plane:

which makes an angle with the plane of this area, said angle being different from 90° and able to avoid parasitic reflection of light, or which is perpendicular to the plane of this area and makes an angle with the optical axis of said area, said angle being different from 90° and able to avoid parasitic reflection of light.

In doing this, the pieces may be formed on a substrate or substrates and then joined so that the separation plane:

makes an angle with the plane of the corresponding planar area, said angle being different from 90° and able to avoid parasitic reflection of light, or is perpendicular to the corresponding planar area and makes an angle with the optical axis of this planar area, said angle being different from 90° and able to avoid parasitic reflection of light.

Figure 9:
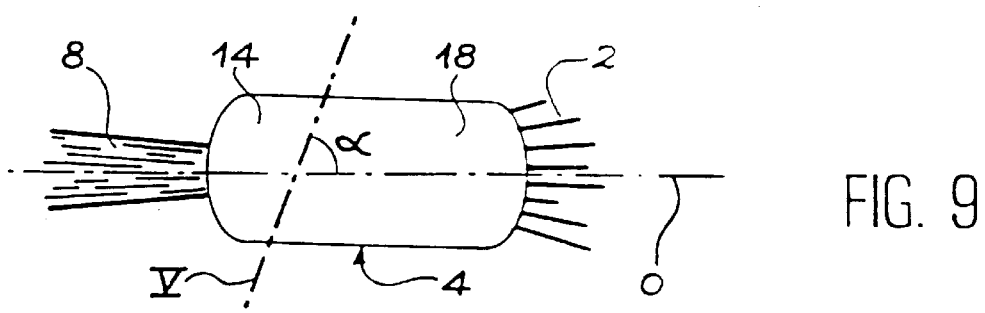
Figure 10:
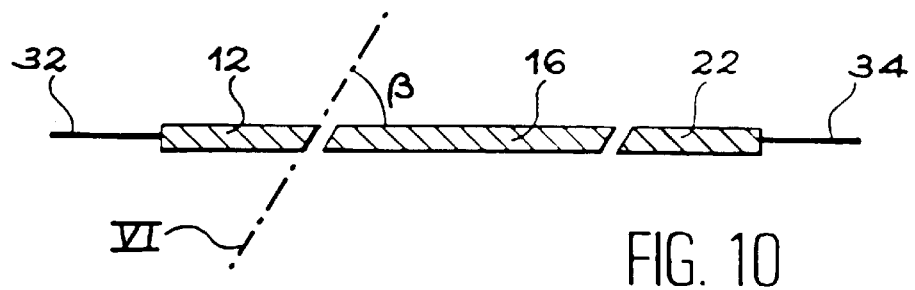

All this is illustrated diagrammatically in FIGS. 9 and 10. For the example in FIG. 9, the example of the planar area 4 in FIG. 2 is used, separated here into two parts 14 and 16 along a plane perpendicular to this area but making an angle a $\beta \neq 90°$ with the optical axis 0 of this area. FIG. 9 is a top view and the cut plane is shown by a line V.

For the example in FIG. 10, the embodiment in FIG. 5 is repeated with the same numeric references. In the case in this FIG. 10, the separation plane makes an angle $\beta \neq 90°$ with the plane of pieces 12, 16 and 22 (corresponding to the plane of the substrate in which these pieces were formed). This separation plane is represented by a line VI in FIG. 10 which is a cross-sectional view. This thus prevents parasitic reflection phenomena, provided that the angles $\alpha$ and $\beta$ are such that no light reflected on the separation between the pieces reaches light input means (references 8 in FIG. 9 and 32 in FIG. 10).

By way of example an angle $\beta$ of the order of 82° (90°–8° see document (13)) may be suitable and the angle $\alpha$ may be chosen as a function of the proximity of these light input means.

The following documents are mentioned in this description:

(1) C. Dragone, "An N×N optical multiplexer using a planar arrangement of two star couplers", *IEEE Photonics Technology Letters*, 3, 9 pp 812–815 (1991).

(2) C. Dragone, "Improved optical switch multiplexer and demultiplexer", European patent application EP 0 528 652 A published on Feb. 24 1993.

(3) C. Grand et al., "16-Channel optical Wavelength Multiplexer/Demultiplexer Integrated on Silicon Substrate" proceedings of *EFOC'LAN, London*, pp 264–267, 1991.

(4) H. Takahashi et al., "10 GHz spacing optical frequency division multiplexer based on arrayed-waveguide grating", *Electronics Letters*, 28, 4, pp 380–382, 1992.

(5) H. Yamada et al., "Statically-phase-compensated 10 GHz-spaced arrayed-waveguide grating" *El. Letters*, vol. 32, pp 1580–1582, 1996.

(6) H. Uetsaka et al. "Novel 1×N guidedwave multi/demultiplexer for FDM, OFC 95 *Technical digest*, pp. 76–77, 1995.

(7) H. Uetsaka et al., "Recent improvements in arrayed waveguide operating dense wavelength division multiplexer/demultiplexers", *Proc. ECIO* 97, pp. 76–79

(8) C. R. Doerr et al., "A monolithic multiplexed 16-wavelength WDM transmitter with accurate channel spacing, OFC 96.

(9) Y. Inoue et al., *El Letters*, vol. 31, 9, pp 726–727, 1995.

(10) P. C. Clemens et al., "Optical phased-array in SiO$_2$/Si with adaptable center wavelength", *Proc. ECIO* 95, Delft, pp 505–508.

(11) H. Yokosuka et al., "Multifiber optical components for subscriber networks", *Proc. ECTC* 96, pp. 487–493.

(12) M. K. Smit et al., "PHASAR-based WDM-devices: principles, design and applications", *IEEE Journal of Selected Topics in Quantum Electronics*, vol. 2, 2, June 1996 (special issue on IO), pp. 236–250.

(13) M. Ishii et al., *IEEE Photonics Technology Letters*, vol. 8, No. 3, March 1996, pp. 387 to 389.

(14) WO 9600915A (SIEMENS AG)—see also U.S. 5,732,171.

What is claimed is:

1. A phased array device having a central wave length, said device comprising:

a first member having a planar input area;

a second member having a planar output area;

a microguides array arranged between said input and output areas;

input means for applying a light beam to said planar input area; and output means for outputting a light beam from said planar output area, at least one of said members being formed of two parts, one of said parts including at least a portion of one of said planar input and output areas and its respective input or output means and the other part of said one member including the complementary portion of said one of said planar input and output areas, said microguides array and said other member, whereby said central wave length of said device may be adjusted by adjusting said two parts of said one member with respect to each other.

2. A phased array device having a central wave length, said device comprising:

a first member having a planar input area;

a second member having a planar output area;

a microguides array arranged between said input and output areas;

input means for applying a light beam to said planar input area; and output means for outputting a light beam from said planar output area, said first and second members being formed of three parts, one of said parts including said input means and at least a portion of said input planar area, a second of said three parts including the complementary portion of said input planar area, said microguides array and a portion of said output planar area, the third of said three parts including the complementary portion of said output planar area and said output means, whereby when said three parts of said members are arranged so that said complementary portions of said planar areas are respectively connected, the central wave length of said device may be adjusted by adjusting the relative positions of said three parts with respect to each other.

3. Device according to claim 1, wherein the first part includes said input means and a portion of the input planar area and the second part includes the complementary portion of the input planar area, the output planar area and said output means.

4. Device according to claim 1, in which the first part comprises a portion of each of the first and the second planar areas and the second part comprises the complementary portions of the first and second planar areas respectively.

5. Device according to claim 4, in which said complementary portions are located on the same side of the second part.

6. Device according to claim 2, in which the complementary portions of the planar areas are located on the same side of the second part.

7. Device according to claim 1, in which said input means and said output means extend substantially in a straight line starting from their respective planar areas.

8. Device according to claim 1, also comprising a support for mounting all of said elements of said phased array device.

9. Device according to claim 8, wherein said elements are mounted on said support in a fixed, predetermined manner.

10. Device according to claim 8, wherein at least one part comprising a portion of the planar area and the respective means are mounted on to the support in a fixed manner.

11. Device according to claim 1, in which the two portions of the planar area which are to cooperate with each other, are joined along a plane which makes an angle with the plane of this planar area, said angle being different from 90°.

12. Device according to claim 1, in which the two portions of the planar area which are to cooperate with each other, are joined along a plane which is perpendicular to the plane of this planar area and makes an angle with the optical axis of this planar area, said angle being different from 90°.

13. Manufacturing process for the device according to claim 1, wherein said parts are formed, said parts cooperating with each other to form the entire device and this device is then adjusted in wave length.

14. Process according to claim 13, in which a relative displacement of one part is made with respect to the other to adjust the central wavelength of the device.

15. Process according to claim 13, in which the light wave input means and the light wave output means are optically linked to at least one of the group including optical fibers, light emitters, receivers, and to light emitters-receivers before the device is adjusted in wavelength.

16. Process according to claim 13, in which each part is formed on a substrate and is then separated from this substrate by sawing.

17. Process according to claim 16, in which at least one edge of this part is then polished.

18. Process according to claim 13, in which each part is formed on a substrate that can be cleaved and then separated from this substrate by cleavage.

19. Process according to claim 13, in which the parts are formed on a substrate or substrates and then joined so that the separation plane makes an angle with the plane of the corresponding planar area, said angle being different from 90°.

20. Process according to claim 13, in which the parts are formed on a substrate or substrates and then joined so that the separation plane is perpendicular to the corresponding planar area and makes an angle with the optical axis of this planar area, said angle being different from 90°.

* * * * *